Nov. 23, 1965 A. R. COSTANTINI ETAL 3,219,405
SUPPORT CONSTRUCTION FOR REMOVABLE SHELVES AND THE LIKE
Filed Oct. 1, 1963 3 Sheets-Sheet 1
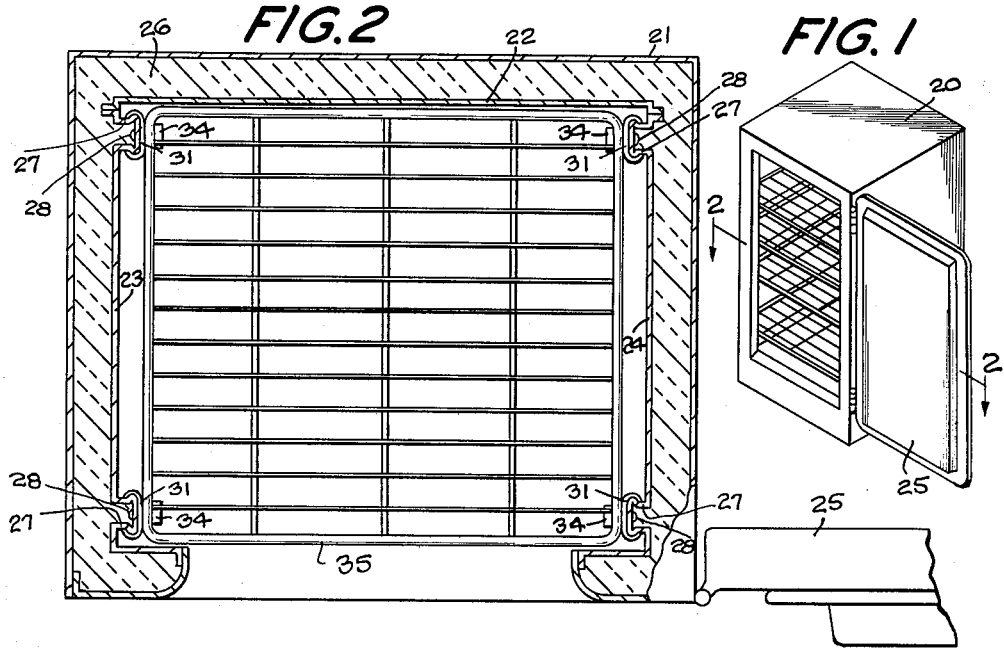
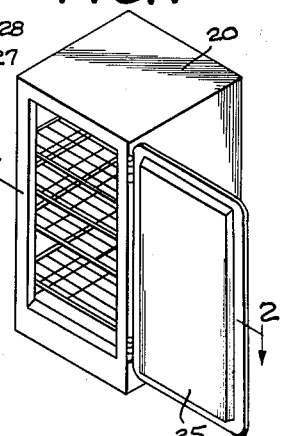
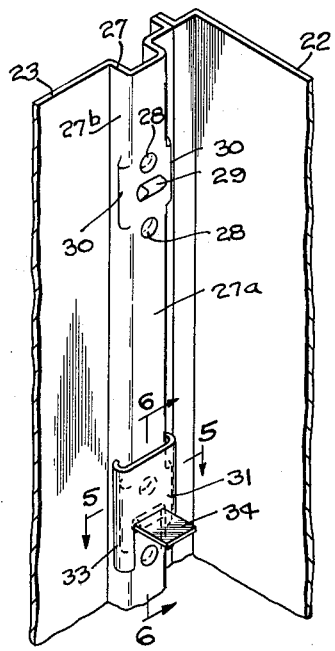
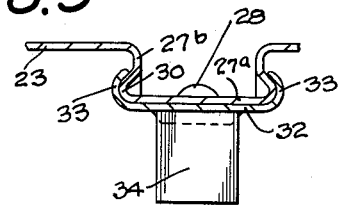
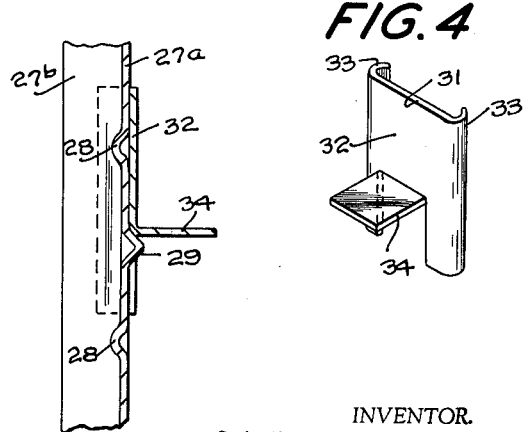
INVENTOR.
ANTHONY R. COSTANTINI
BY ANTHONY Di ANGELUS
ATTORNEY Nov. 23, 1965  A. R. COSTANTINI ETAL  3,219,405
SUPPORT CONSTRUCTION FOR REMOVABLE SHELVES AND THE LIKE
Filed Oct. 1, 1963  3 Sheets-Sheet 2
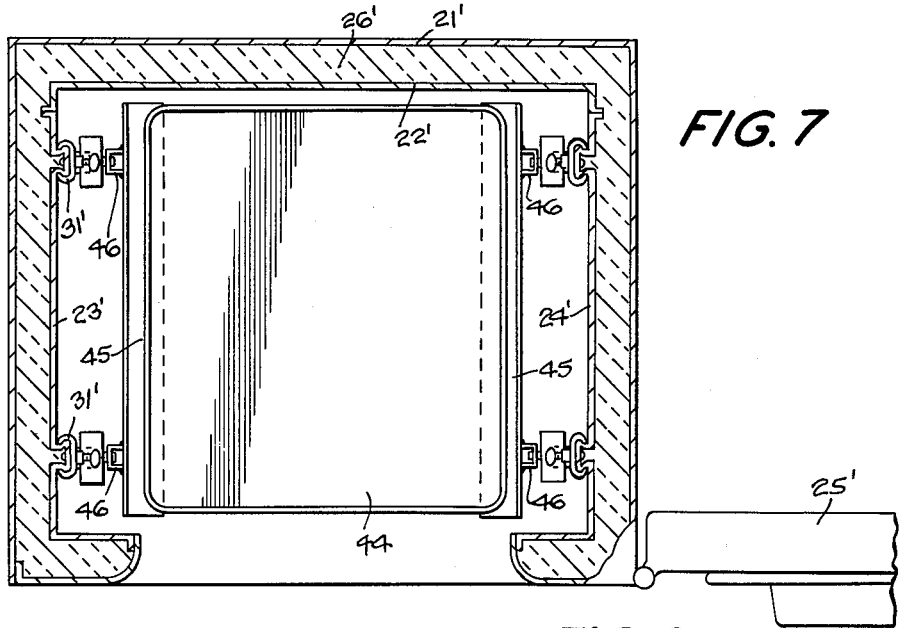
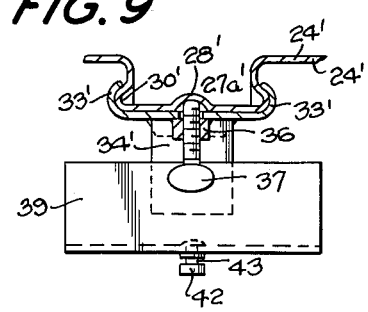
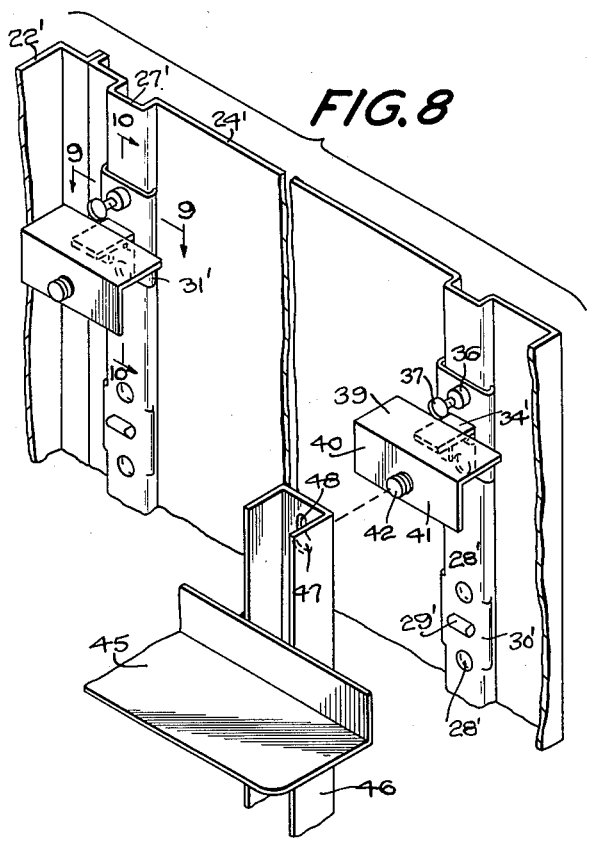
INVENTOR.
ANTHONY R. COSTANTINI
BY ANTHONY Di ANGELUS
*Leo Edelson*
ATTORNEY Nov. 23, 1965 A. R. COSTANTINI ETAL 3,219,405
SUPPORT CONSTRUCTION FOR REMOVABLE SHELVES AND THE LIKE
Filed Oct. 1, 1963 3 Sheets-Sheet 3
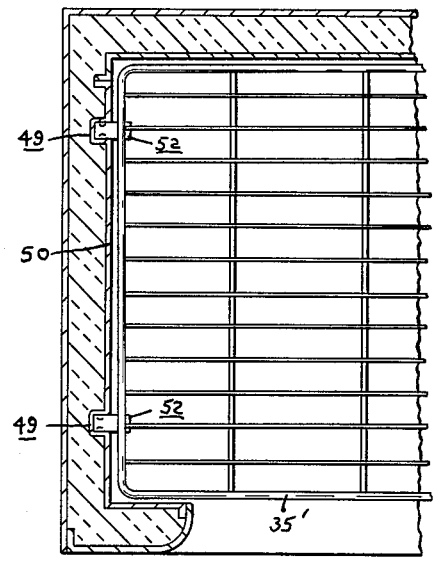
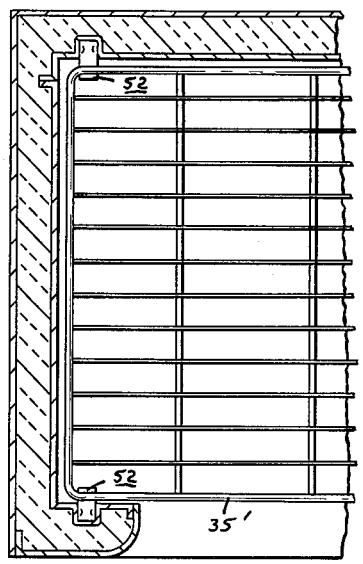
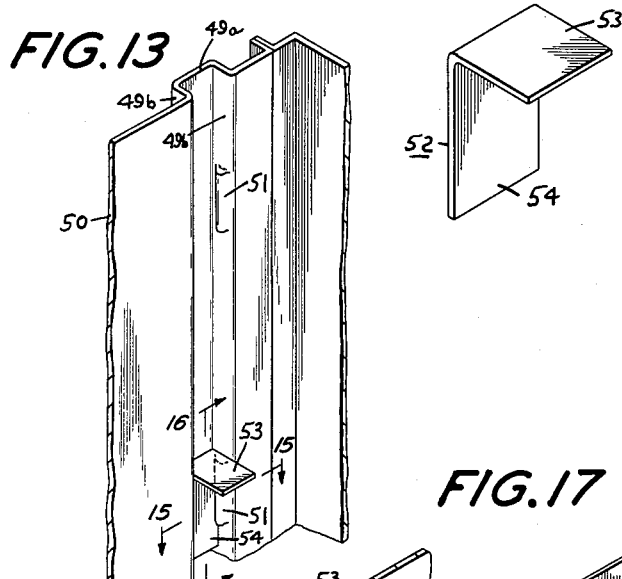
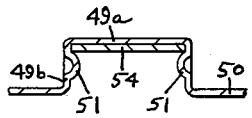
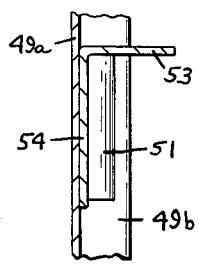
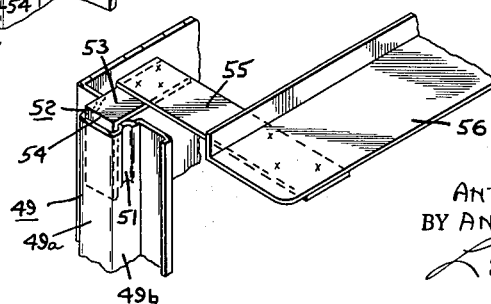
INVENTORS
ANTHONY R. COSTANTINI
BY ANTHONY DiANGELUS
ATTORNEY

United States Patent Office 3,219,405
Patented Nov. 23, 1965

3,219,405
SUPPORT CONSTRUCTION FOR REMOVABLE
SHELVES AND THE LIKE
Anthony R. Costantini, Lafayette Hill, and Anthony Di
Angelus, Manoa, Pa., assignors to Victory Metal Manufacturing Company, doing business as Victory Metal
Manufacturing Corporation, Plymouth Meeting, Pa., a
corporation of Pennsylvania
Filed Oct. 1, 1963, Ser. No. 312,998
14 Claims. (Cl. 312—351)

This invention relates generally to refrigerators, and more particularly relates to the provision of assemblies detachably securable within the refrigerator interior for supporting various types of trays, pans, shelves and drawers. The novel assembly according to the invention includes vertically extending pilaster structures integrally formed with the interior walls of the refrigerator and which are engageable by rail supporting clip devices vertically positionable as desired with regard to the pilasters.

In the past, individual and independent pilaster strips have been semi-permanently secured to cabinet side wall liners by means of screws or bolts or other fastening devices projected through the pilaster strips and anchored into the cabinet side walls. While pilaster strips so secured were not an integrally formed part of the cabinet side walls, the generally employed forms of securing means were intended to permanently secure the pilasters to the side walls so that quick and easy detachment of the pilasters from the side wall liners was neither possible nor was it contemplated.

Such an arrangement is generally satisfactory for most types of cabinet construction since it is rarely desired to remove such pilasters once they have been installed. This, however, is not true of refrigerators and freezers within which it is intended to store food products, because such cabinets must be capable of thorough cleansing to prevent contamination of food stored therein by the build up of unsanitary deposits in crevices and recesses to which ready access can not be had for cleaning purposes. It will be appreciated that while the trays and shelves, and generally the supporting brackets, are usually readily removable from the interior of the refrigerator cabinets, the pilasters themselves are not so removable and as a practical matter are not removed when the interior of the cabinet is cleaned. The space between the pilasters and the cabinet wall liners is thus rendered generally inaccessible and can not be properly cleaned.

Our invention overcomes this problem by means of a novel arrangement by which the pilaster strips are integrally formed with the cabinet interior wall liners, have no apertures or perforations therethrough, and are turned smoothly out of the wall liners so that there exist no sharp corners or crevices within which dirt may accumulate. Thus, removal of the shelves and supporting brackets carried by the pilasters presents a refrigerator cabinet interior which may be quickly and thoroughly cleaned, the provision of such a structure constituting a principal object of our invention.

Another object of our invention is to provide a novel refrigerator cabinet shelf support structure including a pilaster strip integrally formed with the wall liner and provided with expanded and depressed regions by means of which inexpensive and simply formed shelf supporting clips may be quickly and easily detachably secured thereto.

A further object of our invention is to provide a novel refrigerator compartment shelf support structure having a pilaster construction as aforesaid to which may be secured by means of a novel clip structure a side rail frame device provided with a plurality of vertically spaced pairs of shelf supporting side rails whereby a refrigerated compartment interior may be quickly provided with a plurality of racks, shelves or trays of the slide-out type.

The foregoing and other objects of this invention will become more clear from a reading of the following specifications in conjunction with an examination of the appended drawings, wherein:

FIGURE 1 is a perspective view of a refrigerator with the front door open to show a plurality of racks disposed therein at vertically spaced intervals and extending horizontally within the compartment;

FIGURE 2 is a horizontal sectional view through the refrigerator of FIGURE 1, on an enlarged scale, and as would be seen when viewed along the line 2—2 thereof;

FIGURE 3 is an enlarged fragmentary perspective view of the interior left hand corner region of the refrigerator cabinet illustrating portions of the compartment liners and showing the integrally formed pilaster structure with one form of tray supporting clip secured thereto;

FIGURE 4 is a front perspective view from slightly above of the simple pilaster clip shown in FIGURE 3;

FIGURE 5 is an enlarged horizontal cross sectional view through the pilaster and attached clip of FIGURE 3 as would be seen when viewed along the line 5—5 thereof;

FIGURE 6 is an enlarged vertical sectional view through the pilaster and attached clip shown in FIGURE 3 as would be seen when viewed along the line 6—6 thereof;

FIGURE 7 is similar to FIGURE 2 but illustrates a different type of clip structure secured to the integrally formed pilasters and shows a side rail unit attached thereto;

FIGURE 8 is a fragmentary enlarged perspective view of a portion of the right hand side wall compartment liner of FIGURE 7 illustration in more detail the structure and arrangement of the pilaster carried clips, also showing a fragment of the side rail support unit which is detachably carried by the clips;

FIGURE 9 is an enlarged horizontal cross sectional view taken through the pilaster and clip secured thereto as would be seen when viewed along the line 9—9 of FIGURE 8;

FIGURE 10 is an enlarged vertical sectional view through the pilaster and attached clip as would be seen when viewed along the line 10—10 of FIGURE 8;

FIGURES 11 and 12 are views similar to that of FIGURE 2 but illustrating a modified form of integral pilaster structure, FIGURE 12 differing from FIGURE 11 in the location of the pilasters;

FIGURE 13 is an enlarged fragmentary perspective view of an interior lefthand corner region of a refrigerator cabinet illustrating portions of the compartment liners and showing the modified type of integrally formed pilaster structure of FIGURE 11 with a tray supporting clip secured thereto;

FIGURE 14 is a front perspective view from slightly above of the pilaster clip shown in FIGURE 13;

FIGURE 15 is an enlarged horizontal cross sectional view through the pilaster and attached clip of FIGURE 13 as would be seen when viewed along the line 15—15 thereof;

FIGURE 16 is an enlarged vertical sectional view through the pilaster and attached clip shown in FIGURE 13 as would be seen when viewed along the line 16—16 thereof; and FIGURE 17 is a fragmentary enlarged perspective rear view of a portion of the side wall compartment liner of FIGURE 13 illustrating in more detail the structure and arrangement of the pilaster carried clips, also showing a fragment of a side rail support unit which may be carried by the clips.

In the several figures, like elements are denoted by like reference characters.

Turning now to the figures, consider first FIGURES 1 and 2 which show a refrigerator designated as 20 formed by an outer shell 21 in conjunction with a plurality of inside compartment liners including a rear wall liner 22, left and right side wall liners 23 and 24 respectively, and a door 25 which closes the compartment front opening when the door is in its closed position, the space between the outer shell 21 and the compartment liners being filled by insulation material 26. Each of the side wall liners proximate the front and rear thereof are formed so as to have a generally rectangularly shaped and vertically extending protrusion 27 which in fact functions as a pilaster.

As best seen in FIGURE 3, the pilasters 27 each have a front face 27a facing into the interior of the compartment and being generally parallel to the plane of the side wall liner of which it forms a part, and have a pair of generally parallel opposite side faces 27b which join the front face to the side wall liner 23 and which are generally perpendicular to the latter. Each pilaster front face 27a is provided at vertically spaced intervals with a pair of vertically spaced dimples or depressions 28, and between which depressions is also formed an outwardly bulged projection or protrusion 29. The front corners of each pilaster 27, where the pilaster front face 27a and side faces 27b merge with one another, are laterally bulged in the vertical region between each pair of depressions 28, as indicated at 30, so that in this region the pilaster 27 is wider at the face 27a than is the case along the vertically extending portions of the pilaster between successive pairs of depressions 28.

Referring now also to FIGURES 4, 5 and 6, there is seen a pilaster clip designated generally as 31 having a flat planar front face 32 from the vertically extending side edges of which are turned rearwardly and inwardly a pair of hooked side edges 33, the lower central region of the front face 32 being cut upward from the bottom and having a tab 34 turned outward therefrom at approximately a right angle thereto. The horizontal distance between the rear edges of the inwardly turned hooked side edges 33 is greater than the spacing between the side faces 27b of the pilaster 27, as is best seen in FIGURE 5, while the horizontal area encompassed within the bounds of the side edges 33 and front base 32 is of substantially the same size and shape as the area of a horizontal cross section taken through the pilaster 27 in the region of the lateral bulges 30, as is also best seen in the showing of FIGURE 5.

The clip 31 may therefore be quickly assembled to the pilaster 27 by first placing the clip upon the pilaster with the rear surface of the flat planar front 32 of the clip seated flatwise against the front face 27a of the pilaster and with the hooked side edges 33 of the clip being simultaneously positioned outward of and along side of the pilaster side faces 27b along a portion of the pilaster 27 above one of the lateral bulge portions 30 of the pilaster, then shifting the entire clip 31 downward along the pilaster so that the clip hooked side edges 33 engage snugly about the pilaster lateral bulges 30. The downward shift of the clip is continued until the under side of the inner end of the clip tab 34 lodges against the upper surface of the pilaster projection 29 which prevents further downward motion of the clip 31.

Removal of the clip 31 is easily effected by merely reversing the foregoing procedure, that is, by pushing upward on the clip tab 34 to vertically upwardly shift the clip until the clip hooked side edges 33 disengage from the pilaster lateral bulges 30, and then merely moving the clip away from and out of contact with the pilaster.

With four such clips 31 secured to the four pilasters 27 in the manner shown in FIGURE 2, all such clips being at the same vertical elevation on their respective pilasters, a shelf 35 may be inserted into the refrigerator compartment so that its outer frame seats upon the clip tabs 34 which latter firmly support the shelf in the desired position. As shown in FIGURE 1, a plurality of shelves may be so positioned within the interior of the refrigerating compartment, and this would be effected by securing the aforedescribed clips 31 to the pilasters 27 at desired vertical intervals to thereby select the spacing between the several shelves. Cleaning of the refrigerated compartment is quickly and easily carried out by first removing all of the shelves 35 and then the supporting clips 31. As best seen from the showing of FIGURE 3, the stripped compartment interior presents unbroken smooth surfaces which are readily thoroughly cleaned, the entire compartment liner being imperforate so that dirt and food products cannot penetrate behind the wall liners into inaccessible regions and thereafter be a continuing source of contamination for the products subsequently stored within the compartment.

Referring now to FIGURES 7 through 10 which illustrate a generally similar refrigerating compartment having integrally formed pilasters to which are secured tray supporting clips, it will be observed that all of the elements 21 through 34 shown in FIGURES 1 to 6 have exact counter-parts in the showings of FIGURES 7 through 10, the counter-part elements being denoted by the same reference character to which a superscript prime has been added. For example, the pilasters 27 of FIGURES 1 through 6 are designated as 27' in FIGURES 7 through 10 and the clips 31 of FIGURES 2 through 6 are designated in FIGURES 7 through 10 as 31', since they include all of the structure of the clips 31 to which some additional elements have been added. Examining now the clips 31' of the showing of FIGURES 7 through 10 it is observed that these clips also have a flat planar front portion 32', hooked side edges 33' and an upturned tab 34'. Additionally, the clip front face 32' has been apertured so that a thumb screw 37 threaded through a bushing 36, which latter is secured to the clip front face, can be projected into disposition within the pilaster depression 28' disposed immediately above the pilaster projection 29' upon which is seated the clip tab 34'. The threading of the thumb screw 37 into the depression 28' of the pilaster after the clip has been properly positioned serves to prevent the clip 31' from being subsequently dislodged upward unless and until the thumb screw 37 is threaded out of the depression 28'. Fixedly secured upon the upper surface of the clip tab 34' as for example by the wells 38 is the horizontally extending leg 39 of an L-shaped angle piece 40 which also has depending therefrom a vertical leg 41. Staked, riveted or otherwise secured to the vertical leg 41 of the angle piece 40 is a stud fitting 42 having a reduced diameter neck region 43.

As best seen in the showings of FIGURES 7 and 8, the refrigerator compartment is provided with trays 44 slidably seated upon angle slides 45 which extend horizontally from front to rear of the refrigerated compartment and which are fixedly secured to vertically extending channel shape members 46. The base of each of the channel shape members 46 is key hole punched so as to be provided with a generally circular opening 47 through which may be projected the head of the stud fitting 42, and from which circular opening 47 vertically upwardly extends a slot 48 of narrower width than the head of the stud fitting 42 but sufficiently wide to accommodate therewithin the neck 43 of the stud fitting. Thus, a tray supporting rack assembly may be quickly hung within the refrigerating compartment on each side thereof by attaching four clips 31' to the pilasters 27', two of such clips being secured to each pilaster at vertically spaced intervals, and then locking the channel shape members 46 to the clips 31' by projecting them onto the clip carried stud fittings 42 in the conventional key hole stud locking manner. The lower end of the channel shape member 46, not shown, is of course provided with a similar key hole arrangement including the circular opening 47 and slot 48 shown at the upper end of the member so that this lower key hole is simultaneously engaged with the clip 31' which is secured to the pilaster in vertically downwardly spaced relationship to the illustrated clip. The top and bottom securement thus effected prevents any tendency toward swinging movement of the tray slide supporting assembly.

It will be observed that the side wall liners 23 and 24 of the refrigerator compartment are symmetrically formed in respect to the pilaster formations 27 thereof and that the several projections 29 and depressions 28 formed on each pilaster formation are correspondingly spaced apart, with each pair of such depressions 28—28 being symmetrically disposed relatively to the projection 29 located centrally therebetween. Thus, each of the side wall liners 23 and 24 are interchangeable one for the other, thereby eliminating the necessity of providing separately formed right and left hand liners each having its integrally formed imperforate pilaster formations.

Turning now to the modified forms of the invention illustrated in FIGURES 11 and 12 it is observed that each of the side wall liners of FIGURE 11 proximate to the front and rear thereof, and the front and rear wall liners of FIGURE 12 proximate to the sides thereof are formed so as to have a generally rectangularly shaped and vertically extending indentation 49 which functions as a pilaster. As best seen in FIGURES 13 and 15 the pilasters 49 each have a rear wall 49a facing into the interior of the compartment and being generally parallel to the plane of the side wall liner 50 of which it forms a part, and have a pair of generally parallel opposite side walls 49b which join the rear wall 49a to the side wall liner 50 and which are generally perpendicular to the latter. The front corners of each pilaster 49, where the pilaster side walls 49b merge with the side wall liner 50, are laterally bulged toward one another at vertically spaced intervals to provide pairs of protrusions as indicated at 51, so that in these regions the pilaster 49 is narrower at the front than at the back and narrower than is the case along the vertically extending portions of the pilaster between successive pairs of protrusions 51.

Referring now also to FIGURES 14 and 16, there is seen a pilaster clip of inverted L-shape designated generally as 52 having a flat planar horizontally extending top wall 53 from the rear edge of which downwardly extends a flat planar vertical leg 54. As best seen in FIGURE 15 the width of the clip 52 between its side edges is substantially equal to the spacing between the side walls 49b of the recessed pilaster 49 while being substantially greater than the lateral spacing between a pair of protrusions 51. The clip 52 may therefore be quickly assembled to the pilaster 49 by first placing the clip within the pilaster with the rear surface of the flat vertical leg 54 of the clip seated flatwise against the front face of the pilaster rear wall 49a along a portion of the pilaster 49 about one of the pairs of lateral bulged protrusions 51 of the pilaster, then shifting the entire clip 52 downward along the pilaster so that the side edges of the clip vertical leg engage snuggly behind the pilaster protrusions. The downward shift of the clip is continued until the under side of the clip top wall 53 lodges against the upper ends of the pilaster projections 51 which prevents further downward motion of the clip 52.

Removal of the clip 52 is easily effected by merely reversing the foregoing procedure, that is, by pushing upward on the clip top wall 53 to vertically upwardly shift the clip until vertical leg 54 disengages from behind the pilaster protrusions 51, and then merely moving the clip away from and out of contact with the pilaster.

With four such clips 52 secured to the four pilasters of a refrigerator in the manner partially shown in FIGURES 11 and 12, all such clips being at the same vertical elevation on their respective pilasters, a shelf 35 may be inserted into the refrigerator compartment so that its outer frame seats upon the top walls of the clips which latter firmly support the shelf in the desired position.

Referring now to FIGURE 17, there is observed a pilaster 49 of the type previously described in connection with the showings of FIGURES 11 to 16, having a support clip 52, also previously described, engaged with a pilaster formed as shown in FIGURE 12. Fixedly secured to the clip top wall 53 and extending laterally inward to the door opening of the refrigerator is a flat bracket 55 upon which is in turn fixedly secured the fore end of a tray slide 56, the rear end of the tray slide being similarly secured to another of the supporting clips. With a pair of such tray slides utilized at opposite sides of the refrigerator a tray may be slidably moved into and out of the refrigerator at each vertical elevation provided with such slides.

Having now described our invention in connection with particularly illustrated embodiments thereof, it will be understood that variations and modifications of our invention may now occur from time to time to those persons normally skilled in the art without departing from the essential scope or spirit of the invention, and accordingly it is intended to claim the same broadly as well as specifically as indicated by the appended claims.

What is claimed as new and useful is:

1. An imperforate panel having formed integrally therewith an imperforate vertically extending pilaster structure, imperforate bracket-supporting means integral with and extending laterally of said pilaster structure, and a bracket detachably engaged with and supported by said pilaster structure and bracket supporting means, said pilaster structure including a pair of spaced-apart parallel extending side walls turned in the same direction out of the plane of the said panel and a bridging wall extending substantially parallel to the plane of said panel and joining the said side walls to one another, said bracket-supporting means including a pair of opposed outwardly facing protrusions of coextensive length respectively projecting from the said pair of sapced-apart pilaster side walls and a third protrusion extending from said bridging wall, said bracket being disposable flatwise against said bridging wall and having opposite side channels presenting toward each other for close fitting embrace of said protrusions to prevent movement of said bracket in all directions except vertical, and said bracket having a portion seatable upon said third protrusion to prevent downward vertical movement of said bracket relatively to said pilaster.

2. An imperforate panel having formed integrally therewith an imperforate vertically extending pilaster structure, imperforate bracket-supporting means integral with and extending laterally of said pilaster structure, and a bracket detachably engaged with and supported by said pilaster structure and bracket supporting means, said pilaster structure being in the form of an elongated channel pressed out of the plane of the said panel, said channel having opposite side walls and a bridging wall joining the said walls to one another, said bracket-supporting means including a pair of opposed transversely spaced and alined projections integrally formed in said channel side walls, said projections extending outwardly of said side walls and being of coextensive length, said bracket having oppositely channeled sides respectively embracing the said pilaster structure side wall projections to prevent movement of said bracket in all directions except longitudinally of saiid pilaster structure, and means to limit movement of said bracket longitudinally of the pilaster structure upon engagement of said bracket with said bracket-supporting means.

3. In a structure as defined in claim 2 wherein said projections extend outwardly of said channel side walls and wherein the bridging wall of said channel is provided with an additional projection extending outwardly thereof to provide a stop forming part of said means for limiting longitudinal movement of the bracket relatively to said pilaster structure.

4. A structure as defined in claim 2 characterized by the provision of bracket locking means carried by said bracket, said locking means including a shiftable detent movable into and out of a depression formed in the bridging wall of said elongated channel.

5. A cabinet construction having a vertically extending interior wall formed of a panel as defined in claim 2 and wherein said panel is provided with a plurality of said pilaster structures spaced transversely of the panel and extending vertically thereof.

6. A cabinet construction having a vertically extending interior wall formed of a panel as defined in claim 2, each such panel being provided with a plurality of said pilaster structures extending vertically thereof and arranged in transversely spaced relation with each such pilaster structure having a plurality of said bracket supporting means arranged in vertically spaced relation for respectively mounting said brackets in horizontally alined paired relation along said interior wall of the cabinet.

7. An imperforate panel having formed integrally therewith an imperforate vertically extending pilaster structure, imperforate bracket-supporting means integral with and extending laterally of said pilaster structure, and a bracket detachably engaged with and supported by said pilaster structure and bracket supporting means, said pilaster structure being in the form of an elongated channel pressed out of the plane of said panel, said channel having opposite side walls and a bridging wall, said bracket-supporting means including a pair of opposed transversely spaced and alined projections integrally formed in said channel side walls, said projections extending inwardly of said channel side walls in spaced relation to the bridging wall thereof and being of coextensive length, said bracket having angularly related portions one of which is adapted to slidably fit between the bridging wall and the opposed projections of the channeled pilaster structure and the other of which is adapted to extend outwardly of said channel while resting upon said projections whereby to secure said bracket against lateral and longitudinal movement thereof relatively to the pilaster structure.

8. An imperforate panel having formed integrally therewith an imperforate pilaster structure, imperforate bracket-supporting means integral with and extending laterally of said pilaster structure, a bracket detachably engaged with and supported by said pilaster structure and bracket-supporting means, and an assembly for supporting slidable trays detachably secured to and carried by said bracket.

9. An imperforate main panel having formed integrally therewith as a one-piece construction an imperforate vertically extending pilaster structure, imperforate bracket-supporting means integral with said pilaster structure, and a bracket detachably engaged with and supported by said pilaster structure and bracket-supporting means, said pilaster being in the form of an elongated channel pressed out of the plane of said panel, said channel having opposite parallel side walls extending normal to and a base wall disposed parallel to the plane of said main panel, said bracket-supporting means including a pair of opposed transversely spaced and alined imperforate projections integrally formed in said opposite side walls of the pilaster channel, said projections being respectively pressed out of said side walls of the pilaster channel and being of such substantial coextensive length as to provide conjointly with the main panel a pair of parallel ways extending a substantial distance along the length of the pilaster, said bracket having a pair of opposed coplanar edge portions respectively slidably engageable in said ways to prevent movement of said bracket relatively to said pilaster in any direction except longitudinally thereof, and stop means integral with said pilaster and engageable by said bracket to limit movement of the bracket in one direction longitudinally of the pilaster upon slidable insertion of said bracket into said ways.

10. In a structure as defined in claim 9 wherein said projections of said bracket-supporting means extend outwardly of said channel side walls and said stop means projects outwardly of the base wall of the pilaster.

11. In a structure as defined in claim 9 wherein way-engaging edge portions of said bracket are inturned to provide opposed channels which respectively embrace the pilaster side wall projections and wherein the central body portion of the bracket extending between the opposite channels thereof closely overlies the base wall of the pilaster when the bracket is secured in position.

12. In a structure as defined in claim 11 wherein said stop means projects outwardly of the base wall of the pilaster at a point located intermediate the length of said projections and wherein the central body portion of the bracket is slotted to provide a pair of laterally spaced, downwardly projecting leg portions which straddle said stop means upon engagement of the bracket with the pilaster.

13. A structure as defined in claim 9 characterized by the provision of means carried by the bracket and engageable with the pilaster for locking the bracket against movement relatively to the pilaster with which it is engaged.

14. In a structure as defined in claim 9 wherein said side wall projections of said pilaster channel project inwardly thereof whereby said ways are within the pilaster channel immediately adjacent the base wall thereof and wherein said bracket is essentially of right angle formation having a vertical leg slidable into said ways and a horizontal leg resting upon the upper ends of said projections whereby said bracket is held against downward longitudinal displacement relatively to the pilaster with which it is engaged.

References Cited by the Examiner

UNITED STATES PATENTS

| | | | |
|---|---|---|---|
| 139,408 | 5/1873 | Meigs | 248—244 |
| 318,343 | 5/1885 | Baublits | 248—244 |
| 2,872,144 | 2/1959 | Hobson | 248—223 |

FRANK B. SHERRY, *Primary Examiner.*

CHANCELLOR E. HARRIS, *Examiner.*